United States Patent [19]
Saito

[11] Patent Number: 5,659,450
[45] Date of Patent: Aug. 19, 1997

[54] THIN FILM RECORDING HEAD HAVING ENHANCED ELECTRICAL INSULATIVE PROPERTIES

[75] Inventor: Mikiko Saito, Tokyo, Japan

[73] Assignee: NEC Corporation, Tokyo, Japan

[21] Appl. No.: 363,314

[22] Filed: Dec. 23, 1994

[30] Foreign Application Priority Data

Dec. 27, 1993 [JP] Japan .................................. 5-330434

[51] Int. Cl.$^6$ .......................... G11B 5/147; G11B 5/235
[52] U.S. Cl. ............................................. 360/126; 360/120
[58] Field of Search .................................. 360/125, 126, 360/127, 119, 120, 121; 430/311; 252/192, 600

[56] References Cited

U.S. PATENT DOCUMENTS 4,847,327  7/1989  Rupp et al. ..................... 430/311 X

FOREIGN PATENT DOCUMENTS 60-131607  7/1985  Japan .
62-70837   4/1987  Japan .
2236809    9/1990  Japan .

Primary Examiner—Stuart S. Levy
Assistant Examiner—William J. Klimowicz
Attorney, Agent, or Firm—Sughrue, Mion, Zinn, Macpeak & Seas

[57] ABSTRACT

The invention provides a thin film recording head including an upper magnetic substance, a lower magnetic substance cooperating with the upper magnetic substance to form a magnetic circuit, at least one coil layer interposed between the upper and lower magnetic substances, the coil layer being configured in a coil pattern, and an insulative layer interposed between the upper and lower magnetic substances and surrounding the coil pattern. The insulative layer is composed of a hard-cured photoresist. A peak intensity ratio of a surface portion of the insulative layer is equal to or less than 0.5 relative to a peak intensity of aromatic C═C bonding, which aromatic is a main constituent of the photoresist. The peak intensity ratio represents an amount of hydrophilic radical groups. The invention suppresses the hydrophilic property of a hard-cured photoresist layer to reduce the noise of a thin film head.

13 Claims, 5 Drawing Sheets

ION MILLING

ION IMPLANTATION

THIN FILM RECORDING HEAD HAVING ENHANCED ELECTRICAL INSULATIVE PROPERTIES

BACKGROUND OF THE INVENTION

1. Field of the Invention

The invention relates to a thin film recording head for use with a magnetic recording device such as a magnetic disk, and also to a method for manufacturing, such a thin film.

2. Description of the Related Art

FIG. 1 is a cross-sectional view illustrating a prior thin film head. The prior thin film is manufactured generally as follows. First, on an $Al_2O_3$-TiC substrate 1 is formed an insulative layer 2 composed of alumina by means of sputtering. Then, on the insulative layer 2 is formed a lower magnetic layer 3 by sputtering or plating soft magnetic substance such as a permalloy. On the lower pole layer 3 is then formed an insulative gap layer 4 composed of alumina and having a predetermined thickness. Then, an unnecessary rear portion of the insulative gap layer 4 is removed by etching. Then, photoresist is applied on the insulative gap layer 4 by the spin-coating process in order to eliminate an irregularity due to the lower magnetic layer 3. Then, a resulting structure subjected is to heat treatment at approximately 250 degrees centigrade to form a hard-cured photoresist layer 5a.

Then, on the hard-cured photoresist layer 5a is formed a first layer which is to act as a layer for preventing the photoresist layer 5a from peeling off, and on the first layer is formed a second layer which is to act as a underlying layer for plating. The first and second layers are formed by means of sputtering. Then, a coil layer is patterned on the second layer with photoresist, and then coils 6 are formed by means of plating. Then, the photoresist having been used for coil patterning is removed, and further unnecessary portions of the first and second layers are removed by ion-milling in order to smooth irregularities formed by the coils 6, photoresist is applied over the coils 6, and then subject to a heat treatment at 250 degrees centigrade. Thus, there is formed a hard-cured photoresist layer 5b. Then, on the insulative hard-cured photoresist layer 5b is formed an upper magnetic layer 7 in a similar way as that of the lower magnetic layer 3. Thus, a transducer portion of a thin film recording head is completed. The hard-cured photoresist layer 5b provides many advantages. For instance, the hard-cured photoresist layer 5b eliminates irregularities formed by the coils 6, enhances electrical insulation, and smoothes a shoulder portion indicated with C and C'.

Recently, with down-sizing of a device and high densification of magnetic recording, a space between a head and a medium has been much reduced. As a result, it is required to apply a certain plus voltage (for instance, +6 V) to a coil for operating a transistor-driver circuit. However, it has been found that if a prior thin film head would be used for applying a certain voltage to a coil, there occurs dielectric breakdown of a head and an output voltage of a head is decreased to thereby produce a larger noise.

SUMMARY OF THE INVENTION

In view of the foregoing problem of the prior thin film recording head, it is an object of the present invention to provide a thin film recording head which does not induce dielectric breakdown which would be induced by use of the above mentioned prior thin film head, and which has superior output characteristics suitable for highly densified magnetic recording.

Another object of the invention is to provide a method for manufacturing the above mentioned thin film recording head.

In one aspect, the invention provides a thin film recording head including an upper magnetic substance, a lower magnetic substance cooperating with the upper magnetic substance to form a magnetic circuit. At least one coil layer is interposed between the upper and lower magnetic substances, and the coil layer is configured in a coil pattern. An insulative layer is interposed between the upper and lower magnetic substances surrounding the coil pattern. The insulative layer comprises a hard-cured photoresist. A peak intensity ratio of a surface portion of the insulative layer is equal to or less than 0.5 relative to a peak intensity of aromatic C=C bonding, which aromatic is a main constituent of the photoresist. The peak intensity ratio represents an amount of a hydrophilic radical.

In a preferred embodiment, the surface portion of the insulative layer includes a portion located lower than the coil layer and between coils forming the coil pattern.

In another preferred embodiment, the hydrophilic radical is carbonyl group.

In still another preferred embodiment, the surface portion of the insulative layer has a higher cross-linking density than that of an insulative layer located under the coil layer.

In yet another preferred embodiment, the surface portion of the insulative layer has a higher cross-linking density than that of an insulative layer located under the coil layer by at least 10%.

In still yet another preferred embodiment, the surface portion of the insulative layer is densified in terms of cross-linking by implanting ion of an impurity thereinto.

In further preferred embodiment, the impurity is selected from impurities having a small diffusion coefficient in thermosetting photoresist.

In further preferred embodiment, the impurities include P, As, B, Si and Sn.

In further preferred embodiment, the ion is implanted at an amount of dopant in the range of $10^{14}$ to $10^{15}$ $cm^{-2}$.

The invention also provides a thin film recording head including an upper magnetic substance, a lower magnetic substance cooperating with the upper magnetic substance to form a magnetic circuit. At least one coil layer is interposed between the upper and lower magnetic substances, and the coil layer is configured in a coil pattern. An insulative layer is interposed between the upper and lower magnetic substances surrounding the coil pattern. The insulative layer comprises a hard-cured photoresist. A surface portion of the insulative layer has a higher cross-linking density than that of an insulative layer located under the coil layer by at least 10%. The surface portion of the insulative layer comprises a portion located lower than the coil layer and between coils forming the coil pattern.

In another aspect, the invention provides a method for manufacturing a thin film recording head, including the steps of forming a first hard-cured photoresist layer on a lower magnetic substance, forming an underlying layer for plating on the first hard-cured photoresist layer, forming a coil layer on the underlying layer, the coil layer being configured in a coil pattern, forming a second hard-cured photoresist layer over the coil pattern, forming an upper magnetic substance on the second hard-cured photoresist layer, and removing unnecessary portions of the underlying layer by ion-milling in an Ar atmosphere with an acceleration voltage of ion-milling being equal to or less than 500 V.

In a preferred embodiment, the underlying layer comprises Cu.

The invention also provides a method for manufacturing a thin film recording head, including the steps of forming a first hard-cured photoresist layer on a lower magnetic substance, forming an underlying layer for plating on the first hard-cured photoresist layer, forming a coil layer on the underlying layer, the coil layer being configured in a coil pattern, forming a second hard-cured photoresist layer over the coil pattern, forming an upper magnetic substance on the second hard-cured photoresist layer, and implanting ion of an impurity at an amount of dopant in the range of $10^{14}$ to $10^{15}$ cm$^{-2}$ into a portion of the second hard-cured photoresist layer located lower than the coil layer and between coils forming the coil pattern.

In a preferred embodiment, the impurity is selected from impurities having a small diffusion coefficient in thermosetting photoresist.

in another preferred embodiment, the impurities include P, As, B, Si and Sn.

The inventor has found that the deterioration of electrical insulation of a hard-cured photoresist layer located between coils induces dielectric break down of the head and decreases the output voltage of a head, thereby producing a larger noise.

The deterioration of electrical insulation is considered as follows. FIG. 2 shows the results of an experiment, showing a relationship between a leak current and a peak intensity ratio of a carbonyl group, for example, a hydrophilic group, relative to the C=C peak intensity of novolak resin which is a main constituent of the photoresist. As shown in FIG. 2, with the increase of an amount of hydrophilic carbonyl groups in a surface portion of a hard-cured photoresist layer, which portion is located under a coil layer and between adjacent coils comprising a coil pattern, the hard-cured photoresist tends to absorb humidity and hence decrease its electrical insulation. Such a decrease of the electrical insulation has been found when there were also present other hydrophilic groups such as acid anhydride and aromatic ketone group. It has been confirmed by the results of the experiment that, supposing that a threshold value of a leak current is to be determined to be $10^{-6}$ A, the characteristics of a thin film recording head are not affected if a peak intensity ratio of all peaks of hydrophilic groups such as carbonyl group, acid anhydride and ketone group is equal to or less than 0.5.

FIG. 4 shows the results of an experiment, showing a relationship between a carbonyl peak intensity ratio and ion-milling acceleration voltage applied when an underlying layer located under a coil layer is removed. A conventional method has carried out ion-milling under an acceleration voltage larger than 500 V because a larger acceleration voltage can shorten a time for completing the method. However the inventor has found that with the increase of an ion-milling acceleration voltage, a carbonyl peak intensity ratio is also increased with the result of the deterioration of electrical insulation of photoresist. Though FIG. 4 shows a relationship between an ion-milling acceleration voltage and only a carbonyl peak intensity ratio, the inventor has found that, taking into account other hydrophilic groups present in a hard-cured photoresist, if a peak intensity ratio of all hydrophilic groups present in a hard-cured photoresist layer is approximately 0.5, an ion-milling acceleration voltage equal to or less than 500 V can provide a thin film head having no problems. A smaller amount of hydrophilic groups is preferable. Hence, it is preferable to carry out ion-milling at an acceleration voltage approximately equal to 400 V.

The invention provides the following advantages. The invention deteriorates the hydrophilic property of the hard-cured photoresist layer at a surface thereof to thereby enhance a cross-linking density of a hard-cured photoresist layer. This enhances the electrical insulation and reduces noises produced by the a thin film recording head. A yield of a thin film recording head is also enhanced.

In addition, the fluctuations of internal stress of a hard-cured photoresist layer are decreased because the amount of humidity absorbed is decreased. This makes it easy to control the magnetic domain of a permalloy layer growing adjacent to the photoresist layer.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained the hereinbelow with reference to drawings.

Embodiment 1

Figure 1:
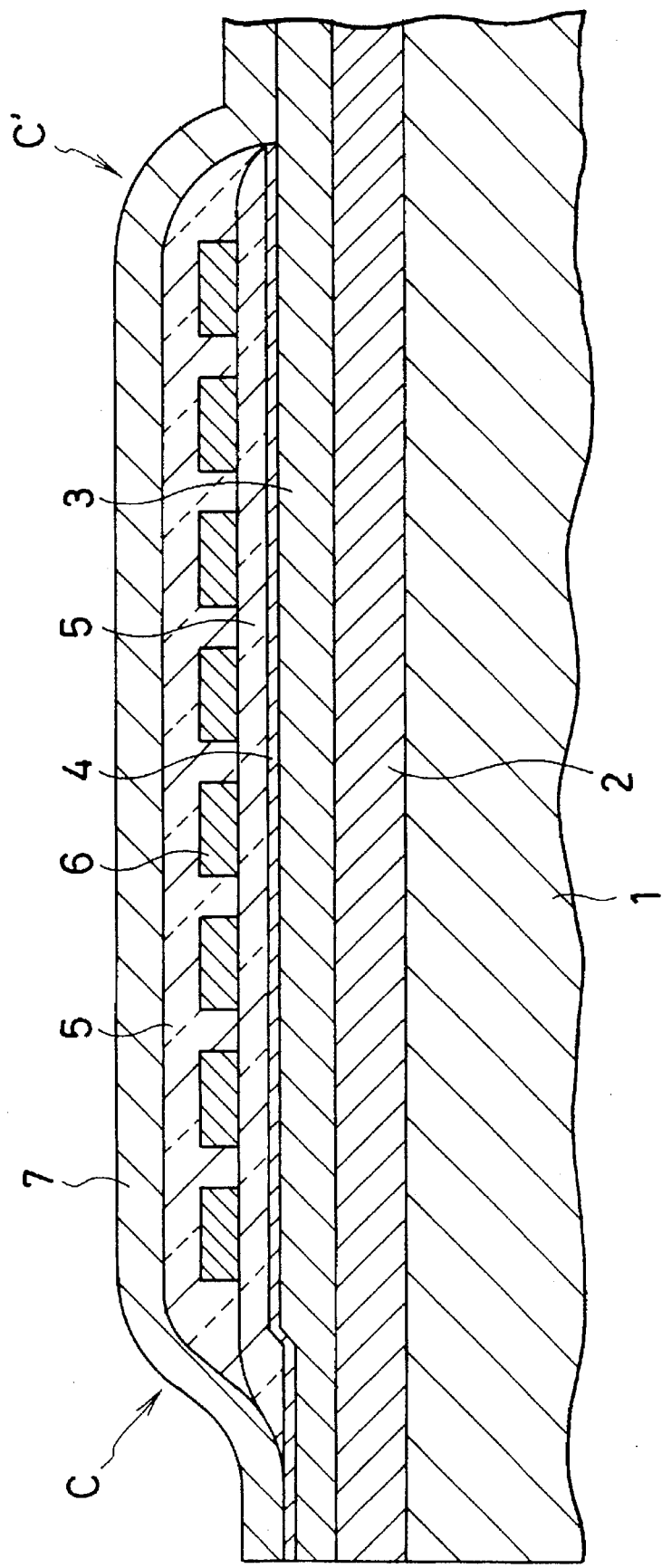
FIG. 1 is a cross-sectional view illustrating a prior thin film recording head.
Figure 2:
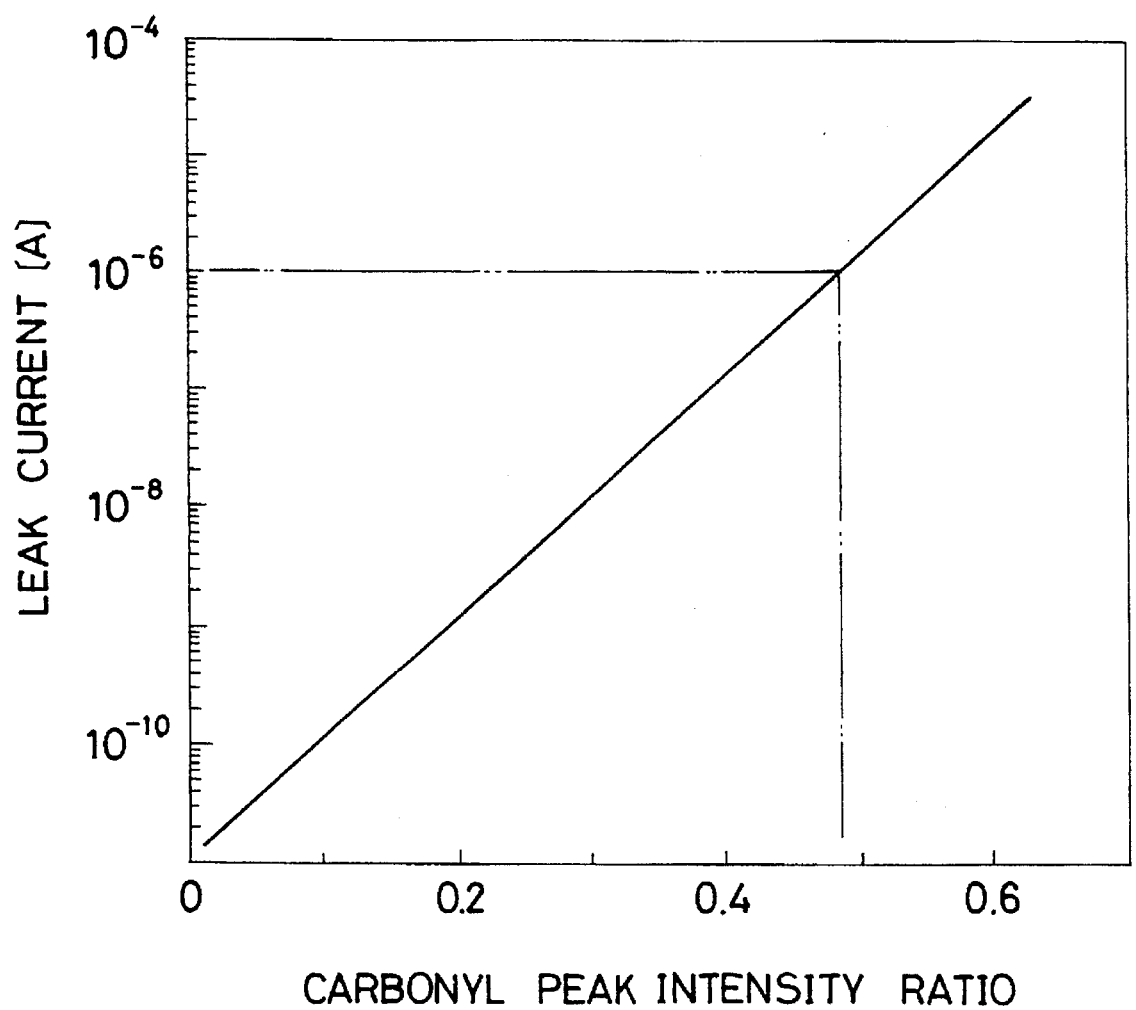
FIG. 2 is a graph showing a relationship between a leak current and a carbonyl peak intensity ratio.
Figure 3A:
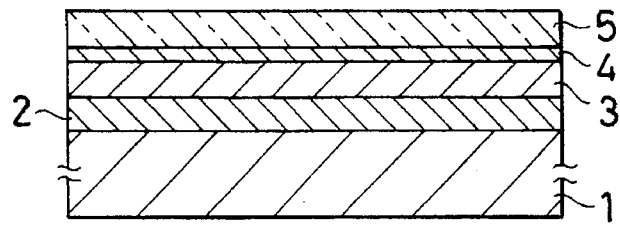
FIGS. 3A, 3B, 3C and 3D, are cross-sectional views illustrating steps of a method for manufacturing a thin film recording head in accordance with the invention.

With reference to FIGS. 3A to 3D, hereinbelow will be explained steps for manufacturing a thin film magnetic head as well as a structure of the thin film magnetic head. As illustrated in FIG. 3A, first, on an $Al_2O_3$-TiC substrate 1 is formed an insulative layer 2 comprising of alumina by means of sputtering. Then, on the insulative layer 2 is formed a lower magnetic layer 3 having a thickness of 3 µm by sputtering or plating soft magnetic substance such as a permalloy. On the lower pole layer 3 is then formed an insulative gap layer 4 comprising alumina and having a predetermined thickness. Then, an unnecessary rear portion of the insulative gap layer 4 is removed by etching. Then, photoresist is applied on the insulative gap layer 4 by a spin-coating process in order to eliminate an irregularity of the lower magnetic layer 3. Then, the resulting structure is subjected to heat treatment at approximately 250 degrees centigrade to form a hard-cured photoresist layer 5.

Figure 3B:
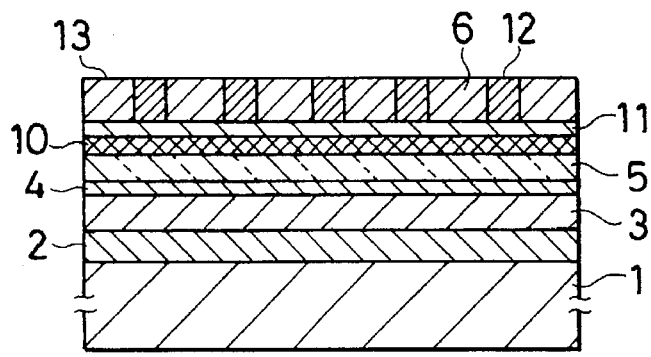
Figure 3C:
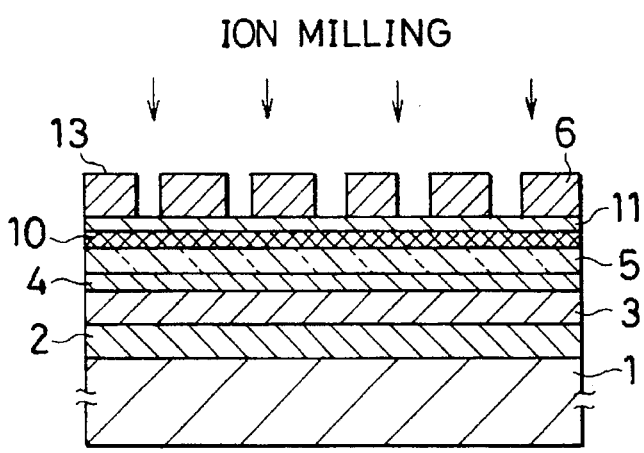

Then, as illustrated in FIG. 3B, on the hard-cured photoresist layer 5 is formed a Cr layer 10 having a thickness of 0.1 µm which is to act as a layer for preventing the photoresist layer 5 from peeling off, and on the Cr layer 10 is formed a Cu layer 11 having a thickness of 0.1 µm which is to act as an underlying layer for plating. The Cr and Cu layers 10, 11 are formed by means of sputtering. Then, a coil layer is patterned on the Cu layer 11 with photoresist to thereby form coils 6 by plating. Then, the photoresist having been used for coil patterning is removed, and further, as illustrated in FIG. 3C, unnecessary portions of the Cu and Cr layers 10, 11 are removed by ion-milling. An ion-milling etching is carried out with ion-milling acceleration voltage being equal to or less than 400 V. As a result, a surface portion of the hard-cured photoresist layer 5, namely a portion located lower than the coils 6 and between the coils 6 turns into a low-hydrophilic layer 16.

Figure 3D:
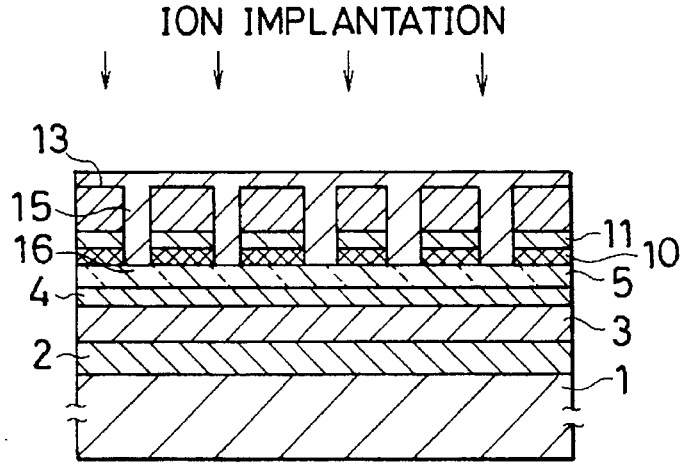
Figure 4:
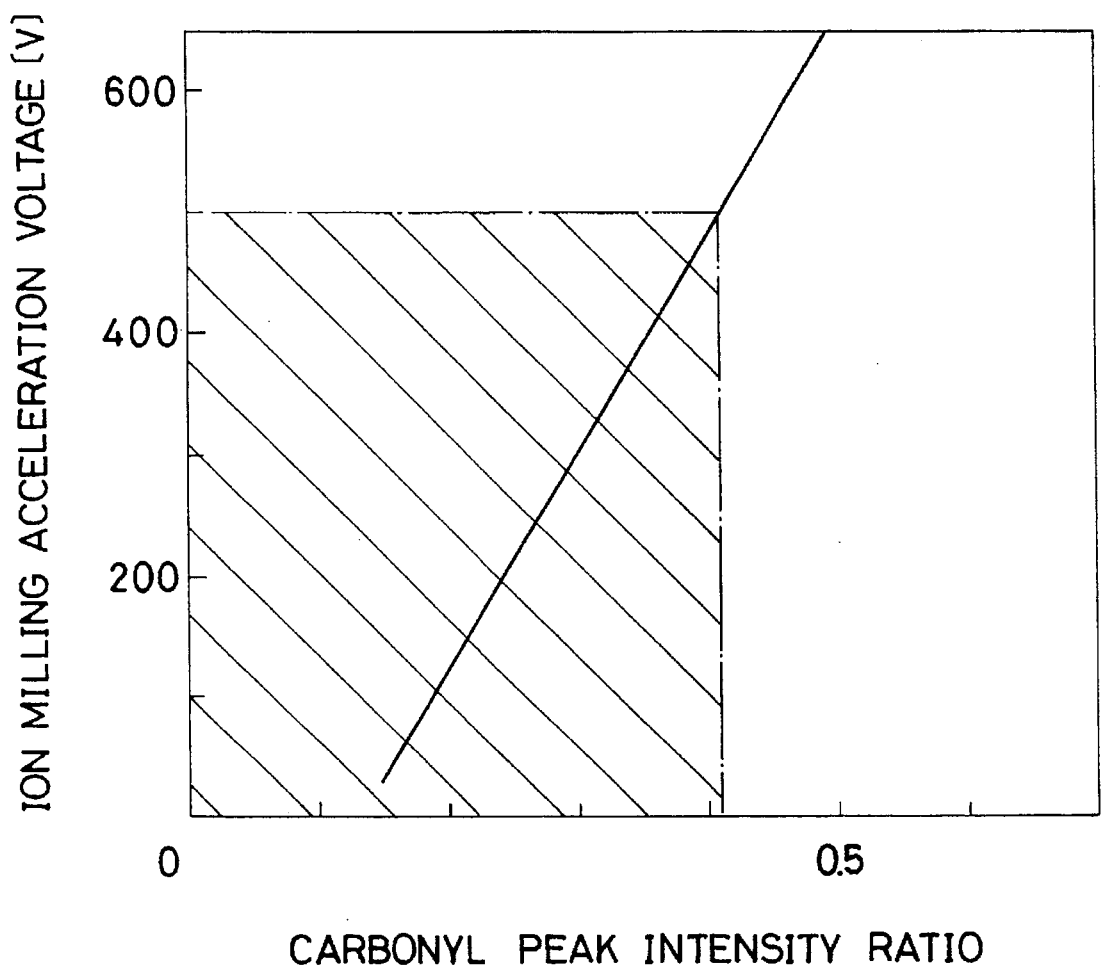
FIG. 4 is a graph showing a relationship between an ion-milling acceleration voltage and a carbonyl peak intensity ratio.

Then, as illustrated in FIG. 3D, in order to smooth irregularities formed by the coils 6, photoresist is applied over the coils 6, and then subject to a heat treatment at 250 degrees centigrade. Thus, there is formed a hard-cured photoresist layer 15. Then, on the insulative hard-cured photoresist layer 15 is formed an upper magnetic layer in a similar way as that of the lower magnetic layer 3 in the case of one coil layer structure, or a coil pattern is formed again in the case multiple coil layers structure. Thus, a transducer portion of a thin film recording head is completed.

The thus obtained thin film recording head has a peak intensity ratio of a hydrophilic group of 0.35, and also has a superior leak current characteristic wherein a the leak current is about $10^{-8}$ A.

Embodiment 2

Figure 5A:
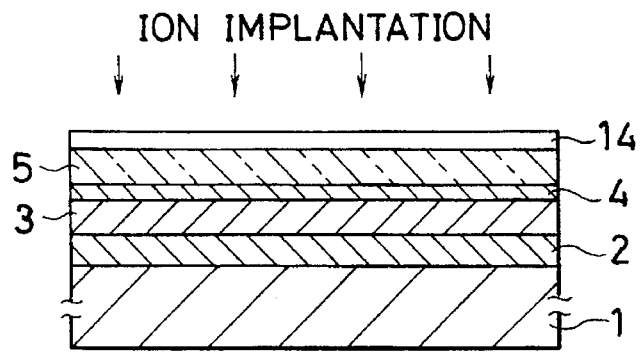
FIGS. 5A, 5B, 5C and 5D are cross-sectional views illustrating steps of a method for manufacturing a thin film recording head in accordance with the invention.

FIGS. 5A to 5D shows another embodiment for manufacturing a thin film recording head in accordance with the invention. As illustrated in FIG. 5A, first, on an $Al_2O_3$-TiC substrate 1 is formed an insulative layer 2 comprising alumina by means of sputtering. Then, on the insulative layer 2 is formed a lower magnetic layer 3 having a thickness of 3 μm by sputtering or plating soft magnetic substance such as a permalloy. On the lower pole layer 3 is then formed an insulative gap layer 4 composed of alumina and having a predetermined thickness. Then, an unnecessary rear portion of the insulative gap layer 4 is removed by etching. Then, photoresist having a thickness of 5 μm is applied on the insulative gap layer 4 by a spin-coating process in order to eliminate an irregularities of the lower magnetic layer 3. Then, the resulting structure subjected is to heat treatment at approximately 250 degrees centigrade to form a hard-cured photoresist layer 5. Then, into a surface of the hard-cured photoresist layer 5 is implanted ion of an impurity at an amount of dopant in the range of $10^{14}$ to $10^{15}$ $cm^{-2}$ in order to avoid quality change of the hard-cured photoresist layer 5. The impurities are selected from impurities having a small diffusion coefficient in a hard-cured photoresist. Such impurities include P, As, B, Si and Sn.

Figure 5B:
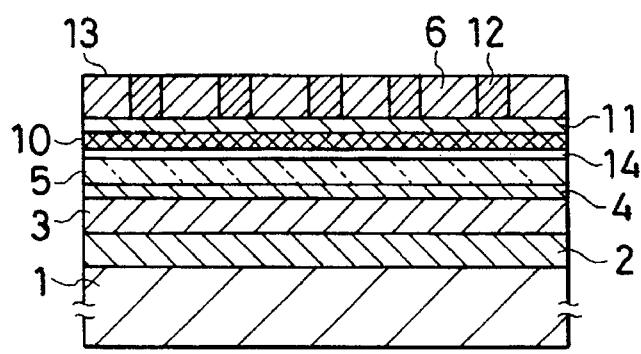
Figure 5C:
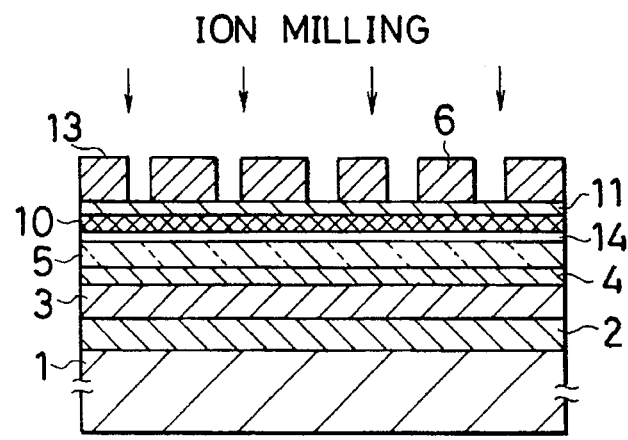

Then, as illustrated in FIG. 5B, on the hard-cured photoresist layer 5 is formed a Cr layer 10 having a thickness of 0.1 μm which is to act as an layer for preventing the photoresist layer 5 from peeling off, and on the Cr layer 10 is formed a Cu layer 11 having a thickness of 0.1 μm which is to act as a underlying layer for plating. The Cr and Cu layers 10, 11 are formed by means of sputtering. Then, a coil layer is patterned on the Cu layer 11 with photoresist to thereby form coils 6 by plating. Then, the photoresist having been used for coil patterning is removed, and further, as illustrated in FIG. 5C, unnecessary portions of the Cu and Cr layers 10, 11 are removed by ion-milling. It is not necessary to set the ion-milling acceleration voltage to less than 500 V.

Figure 5D:
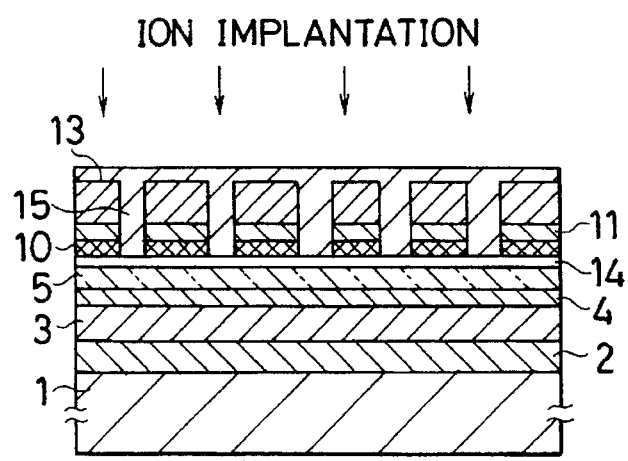

Then, as illustrated in FIG. 5D, in order to smooth irregularities formed by the coils 6, photoresist is applied over the coils 6, and then subject to a heat treatment at 250 degrees centigrade and further to an ion-implantation. Thus, there is formed a hard-cured photoresist layer 15 having a thickness of 5 μm. The ion implantation increases a cross-linking density of the hard-cured photoresist layer, and hence increases inter-molecular energy of the photoresist. Accordingly, the photoresist layer remains unchanged even when it would be subject to subsequent ion-milling. The ion implantation is carried out only when multiple coils are to be formed. When a single coil is to be formed, an upper magnetic layer is formed in place of the ion implantation in the same way as that of the lower magnetic layer. Thus, a transducer portion of a thin film recording head is completed.

The ion-implanted hard-cured photoresist layer has a surface portion having a cross-linking density higher than that of a lower portion thereof by 10% or more. The surface portion of the ion-implanted hard-cured photoresist layer remains unchanged even when the surface portion is subject to subsequent ion-milling and moisture absorption, and thus provides a superior electrical insulation property.

While the present invention has been described in connection with certain preferred embodiments, it is to be understood that the subject matter encompassed by way of the present invention is not limited to the specific embodiments. On the contrary, it is intended for the subject matter of the invention to include all alternatives, modifications and equivalents as can be included within the spirit and scope of the following claims.

What is claimed is:

1. A thin film recording head comprising:

an upper magnetic substance;

a lower magnetic substance cooperating with said upper magnetic substance to form a magnetic circuit;

at least one coil layer interposed between said upper and lower magnetic substances, said coil layer being configured in a coil pattern; and an insulative layer interposed between said upper and lower magnetic substances and surrounding said coil pattern, said insulative layer comprising a hard-cured photoresist, said photoresist comprising aromatic C=C bonding including hydrophilic groups, wherein a peak intensity ratio of hydrophilic groups relative to aromatic C=C bonding at a surface portion of said insulative layer is equal to or less than 0.5 and wherein said aromatic is a main constituent of said photoresist.

2. The thin film recording head as recited in claim 1, wherein said surface portion of said insulative layer comprises a portion located lower than said coil layer and between adjacent coils comprising said coil pattern.

3. The thin film recording head as recited in claim 1, wherein said hydrophilic group is a carbonyl group.

4. The thin film recording head as recited in claim 2, wherein said surface portion of said insulative layer has a higher cross-linking density than that portion of said insulative layer located underneath said coil layer.

5. The thin film recording head as recited in claim 4, wherein said surface portion of said insulative layer has a higher cross-linking density than that portion of said insulative layer located underneath said coil layer by at least 10%.

6. The thin film recording head as recited in claim 4, wherein said surface portion of said insulative layer is densified by implanting ions of an impurity into said surface portion.

7. The thin film recording head as recited in claim 6, wherein said impurity is selected from impurities having a small diffusion coefficient in a thermosetting photoresist.

8. The thin film recording head as recited in claim 7, wherein said impurities include P, As, B, Si and Sn.

9. The thin film recording head as recited in claim 6, wherein said ion is implanted at an amount of dopant in the range from $10^{14}$ to $10^{15}$ $cm^{-2}$.

10. A thin film recording head comprising:

an upper magnetic substance;

a lower magnetic substance cooperating with said upper magnetic substance to form a magnetic circuit;

at least one coil layer interposed between said upper and lower magnetic substances, said coil layer being configured in a coil pattern; and an insulative layer interposed between said upper and lower magnetic substances and surrounding said coil pattern, said insulative layer comprising a hard-cured photoresist, a surface portion of said insulative layer having a higher cross-linking density than that of an insulative layer located underneath said coil layer by at least 10%, wherein said surface portion of said insulative layer comprises a portion located lower than said coil layer and between coils comprising said coil pattern.

11. The thin film recording head as recited in claim 10, wherein said surface portion is densified by implanting ions of an impurity into said surface portion.

12. The thin film recording head as recited in claim 11, wherein said impurity is selected from impurities having a small diffusion coefficient in a thermosetting photoresist.

13. The thin film recording head as recited in claim 12, wherein said impurities include P, As, B, Si and Sn.

* * * * *

UNITED STATES PATENT AND TRADEMARK OFFICE
CERTIFICATE OF CORRECTION

PATENT NO.   : 5,659,450
DATED        : August 19, 1997
INVENTOR(S)  : Mikiko Saito It is certified that error(s) appears in the above-identified patent and that said Letters Patent is hereby corrected as shown below:

IN THE ABSTRACT

Item [54] Line 15, after "to" insert --enhance the electrical insulative property and--.

Column 3, line 18, delete "in" and insert --In--.

Column 5, line 37, delete "an".

Signed and Sealed this

Thirtieth Day of December, 1997

Attest:

BRUCE LEHMAN

*Attesting Officer*   *Commissioner of Patents and Trademarks*